3,554,916
VISCOSITY MODIFICATION OF AMINE SALTS OF
LINEAR ALKYLARYL SULFONATES
Oliver Carl Kerfoot, David W. Marshall, Delmar D.
Krehbiel, and William L. Groves, Jr., Ponca City,
Okla., assignors to Continental Oil Company, Ponca
City, Okla., a corporation of Delaware
No Drawing. Filed June 1, 1965, Ser. No. 460,520
Int. Cl. C11d 1/22, 3/16
U.S. Cl. 252—152                     4 Claims

ABSTRACT OF THE DISCLOSURE

The viscosity of a detergent intermediate consisting of the product of an alkylaryl sulfonic acid neutralized with an amine is reduced by incorporating in said neutralized product a small amount of a $C_4$ to $C_8$ alcohol.

This invention relates generally to detergents. In one aspect this invention relates to controlling the viscosity of certain amine salts of linear alkylaryl sulfonates.

Since the advent of biodegradable linear alkylaryl sulfonates, it has been found that certain salts of these materials in aqueous slurry form are much more viscous and difficult to handle than the corresponding branched chain products (nonbiodegradable) currently in use. This is particularly true of the amine sulfonates, for example, the triethanolamine sulfonate salt which finds use in commercial shampoo and cosmetic formulations. This material, when prepared by neutralizing linear alkylbenzene sulfonic acid ($SO_3$ sulfonated) with aqueous triethanolamine to give a 60% active product, is a very viscous gel which cannot be stirred or poured. Its viscosity is well above 100,000 cps. at room temperature. For some unexplainable reason, the problem seems to be particularly severe when sulfur trioxide is used as the sulfonating agent.

It is an object of this invention to provide a low viscosity of an amine salt of a linear alkylaryl sulfonate.

It is another object of this invention to provide a method of lowering the viscosity of amine salts of a linear alkylaryl sulfonate.

Other objects, features and advantages of this invention will be obvious to those skilled in the art.

These objects are accomplished by incorporating an inorganic salt or ammonia salt of a metal of Groups I, II and III, series 2 through 6 of Mendeleeff's Periodic Table or n-alcohol of 4 to 8 carbon atoms in the amine salt.

The linear alkylaryl sulfonate of this invention are prepared from linear alkaryl sulfonic acids which contain at least 6 side-chain carbon atoms, generally 10 to 20 carbon atoms and preferably 10 to 14 carbon atoms. The aryl radical will be attached to any of the carbon atoms and will generally be a random distribution to give a compound such as

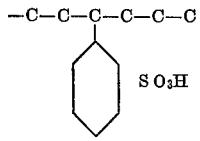

The aryl can be of the benzene, naphthalene or anthracene structure. The $SO_3$ will most generally be in the para position as shown. The phenyl group will generally be preferred. The ring group can have alkyl substituents, but generally they will not total more than 4 carbon atoms in any one alkyl substituent. However, the alkyl portion of the sulfonate product must be linear. A few representative examples of specific compounds include decane-3-benzene sulfonic acid, dodecane-4-naphthalene sulfonic acid, pentadecane-6-anthracene sulfonic acid, octadecane-5-benzene sulfonic acid, dodecane-4-methyl benzene sulfonic acid, decane-5-butyl-ethyl benzene sulfonic acid, dodecane-4-isobutyl benzene sulfonic acid, dodecane-3-toluene sulfonic acid and the like.

Such sulfonated linear alkylaryl sulfonic acids are converted to the detergent compositions by reaction with a hydrocarbon or alkanol amine. The amine can be primary, secondary or tertiary as can the alkanol. The hydrocarbon can be alkyl, aryl, alkaryl and aralkyl and can have branch substituents. In general, the carbon groups will be from 1 to 10 carbon atoms, preferably 1 to 4 carbon atoms, ine the amine. Here the possible number of compounds is also exceedingly great. That is, in general, we prefer an alkyl substituted amine or an alkanol substituted amine. although the alkyl can be normal or branched, and the alcohol can be primary, secondary or tertiary.

Examples of the preferred amines include trimethyl amine, triethyl amine, tripropyl amine, tributyl amine, triisobutyl amine, diethyl amine, dibutyl amine, ethyl amine, triethanol amine, tributanol amine, diethanol amine, propyl amine, methyl diethyl amine, methyl ethyl amine, ethyl butanol amine and the like.

Normal alcohols of 4 to 8 carbon atoms, ammonium salts, and the inorganic strong acid salts of the metals of Groups I, II and II of series 2–6 of the Periodic Table have been found operable in lowering the viscosity of the linear alkylaryl amine sulfonate prepared by reacting the two types of materials described above. This is surprising in that other normal alcohols and isomers even of the $C_4$ to $C_8$ alcohols did not work and that inorganic salts which would be expected to perform in the same manner as the operable inorganic salts failed to work as will be shown later. By strong acid, we mean an acid having an ionization constant of at least $9 \times 10^{-1}$.

Examples of the system of this inevntion include the trimethyl amine salt of decane-3-benzene sulfonic acid plus 2 weight percent $Al(NO_3)_3$; triethyl amine salt of dodecane-4-naphthalene sulfonic acid plus 1 weight percent normal butanol; pentadecane-6-anthracene sulfonic acid salt of tripropyl amine plus 5 weight percent of n-octanol, 4-methyl benzene sulfonic acid salt of tributyl amine plus n-hexanol, triisobutyl amine salt of dodacene-3-toluene sulfonic acid plus LiCl; diethyl amine salt of decane-5-butyl-ethyl benzene sulfonic acid plus 2 weight percent $Li_2SO_4$; ethyl amine salt of decane-5-butyl-ethyl benzene sulfonic acid plus 3 weight percent NaBr; dodecane-3-naphthalene sulfonic acid salt of propyl amine plus 4 weight percent $NaH_2PO_4$; methyl diethyl amine salt of dodecane-4-naphthalene sulfonic acid plus 2 weight percent KCl; ethyl butanol amine salt of dodecane-5-benzene sulfonic acid plus 2 weight percent KBr; tributanol amine salt of decane-4-benzene sulfonic acid plus 2 weight percent $K_2SO_4$; triethyl amine salt of pentadecane-6-benzene sulfonic acid plus 2 weight percent NaCl; triethyl amine salt of dodecane-4-benzene sulfonic acid plus 2 weight percent $NH_4Cl$; tripropyl amine salt of dodecane-5-benzene sulfonic acid plus 2 weight percent of $(NH_4)_2SO_4$ and tributyl amine salt of dodecane-5-benzene sulfonic acid plus 2 weight percent of $NH_4Br$.

The additive is generally used in an amount of at least 1% and preferably 1 to 5%; however, lower amounts will show some improvement whereas higher amounts are generally not necessary. The additive is preferably added to the water in which the amine solution will be prepared prior to neutralization to prevent the formation of the gel. However, reasonable results are obtained if the additive is added to the amine solution.

To further illustrate the invention, the following example is given; however, other detergents of the type described are also benefited by the additives of this invention.

EXAMPLE

A linear alkylbenzene having $C_{12}$–$C_{14}$ carbon atoms in the alkyl group and random benzene distribution with an average molecular weight of 242 was sulfonated with sulfur trioxide to give a sulfonic acid product of the following composition:

| | Percent |
|---|---|
| Sulfonic acid | 96.8 |
| $H_2SO_4$ | 2.1 |
| Water and free oil (balance) | 1.1 |

Portions of this sulfonic acid were neutralized with aqueous triethanolamine (35%) containing the various "additives" under study. Neutralization was carried out both by adding the sulfonic acid to the aqueous base and vice versa. No appreciable differences in product appearance were noticed due to the mode of addition. Slow stirring was maintained throughout the neutralization to provide adequate mixing of reactants, but at a rate to minimize beating excessive air into the product. The pH of the final product was adjusted to about pH 6 (using pH indicator paper). Temperature during neutralization was maintained at 50–60° C. by means of a warm water bath.

A number of additives were screened for effectiveness by this procedure. Although several duplicate runs were made, only one of each type additive is included in the table. The results are shown in Table I.

TABLE I

| Run | Additive | Quantity wt. percent | Viscosity of 60% active triethanol amine sulfonate |
|---|---|---|---|
| 1 | None | | Above 100,000 cps.—gelled. |
| 2 | Ethanol | 5 | Very viscous—gelled. |
| 3 | $NaSO_4$ | 5 | Much lower viscosity. |
| 4 | Same as above | 6 | Do. |
| 5 | do | 4 | Do. |
| 6 | do | 2 | 17,525 cps. |
| 7 | do | 1 | 31,000 cps. |
| 8 | n-propanol | 5 | Gelled—very viscous. |
| 9 | iso-butanol | 5 | Do. |
| 10 | n-hexanol | 2 | Pourable. |
| 11 | NaCl | 2 | Excellent, clear, low viscosity. |
| 12 | Sodium acetate | 5 | Very vircous. |
| 13 | $MgCl_2$ | 1 | Much lower viscosity. |
| 14 | $CaCl_2$ | 1 | 23,800 cps. |
| 15 | Na borate | 1 | Very viscous. |
| 16 | Na phosphate | 1 | Very viscous—gelled. |
| 17 | $BaCl_2$ | 1 | Do. |
| 18 | $Al_2(SO_4)_3$ | 1 | Much lower viscosity. |
| 19 | Xylene sulfonic acid | 2 | Very viscous—gelled. |
| 20 | Na xylene sulfonate | 5 | Do. |
| 21 | n-butyl alcohol | 5 | Much lower viscosity. |
| 22 | $(NH_4)_2SO_4$ | 5 | Do. |
| 23 | isopropyl alcohol | 5 | Very viscous—gelled. |
| 24 | $Al(NO_3)_3$ | 2 | Pourable product. |
| 25 | $Ba(C_2H_3O_2)_2$ | 2 | Large clumps. |
| 26 | $Ca(C_2H_3O_2)_2$ | 2 | Large clumps and gel. |
| 27 | $LiC_2H_3O_2$ | 2 | Do. |
| 28 | LiCl | 2 | Excellent, clear, low viscosity. |
| 29 | $Li_2SO_4$ | 2 | Do. |
| 30 | NaBr | 2 | Do. |
| 31 | Na citrate | 2 | Large clumps and gel. |
| 32 | $NaH_2PO_4$ | 2 | Improved—pourable. |
| 33 | $KC_2H_3O_2$ | 2 | Lumpy—gel. |
| 34 | $SrCl_2$ | 2 | Marbelized—gel. |
| 35 | KCl | 2 | Excellent, clear, low viscosity. |
| 36 | KBr | 2 | Clear solution. |
| 37 | $K_2SO_4$ | 2 | Good clear solution. |
| 38 | n-octanol | 2 | Lower viscosity—pourable. |

From the above table, it is noted that of the alcohols tested, only normal $C_4$ to $C_8$ alcohols were effective. Calcium chloride and magnesium chlorides were effective whereas barium chloride was not. Sodium, potassium and lithium salts of the strong mineral acids were operable, whereas the salts of these same alkalis of organic acids and phosphoric acids were not. While ionization might explain the difference in the salts, this does not explain the peculiarity of the alcohols.

Having thus described the invention, we claim:

1. A process for preventing the gelatin of an aqueous detergent composition consisting essentially of water and at least 60 weight percent of the reaction product of a linear alkylbenzene sulfonated with $SO_3$, wherein the alkyl portion of said alkylbenzene contains 6 to 20 carbon atoms and an alkyl amine wherein the alkyl group contains 1 to 4 carbon atoms or an alkanol amine of up to 4 carbon atoms in the alkyl portion of the alkanol, said process comprising the incorporation in said detergent composition of a degelling agent in an amount of from 1% to 5%, said degelling agent being a $C_4$ to $C_8$ monohydric alcohol.

2. The process of claim 1 wherein the added normal monohydric alcohol is normal butanol.

3. The process of claim 1 wherein the added normal monohydric alcohol is normal octanol.

4. The process of claim 1 wherein the added normal monohydric alcohol is normal hexanol.

References Cited

UNITED STATES PATENTS

| 2,607,740 | 8/1952 | Vitale et al. | 252—89 |
| 2,800,503 | 7/1957 | Crosby et al. | 260—501.19 |
| 3,005,847 | 10/1961 | Bray | 260—501.19 |
| 3,101,324 | 8/1963 | Wixon | 252—137X |
| 3,169,930 | 2/1965 | Gedge | 252—137 |
| 3,320,172 | 5/1967 | Mains et al. | 252—137 |
| 2,768,143 | 10/1956 | Henry | 256—363.5 |
| 2,846,401 | 8/1958 | McCarthy | 252—138 |
| 2,908,651 | 10/1959 | Grifo | 252—161 |
| 2,944,028 | 7/1960 | Stayer | 252—161 |

LEON D. ROSDOL, Primary Examiner

M. HALPERN, Assistant Examiner

U.S. Cl. X.R.

252—137, 161